United States Patent Office 2,707,705
Patented May 3, 1955

2,707,705

LIGHT STABLE PETROLATUM

George J. Rozman, Beaver, Pa., assignor to Ashland Oil & Refining Company, Ashland, Ky., a corporation of Kentucky No Drawing. Application July 3, 1953, Serial No. 366,063

4 Claims. (Cl. 252—51.5)

This invention relates to improved mineral oil jellies of the type generally called petrolatums. It is desirable to provide white or light-colored petrolatums, but petrolatums change in color when exposed to the light, particularly to sunlight. In general, the petrolatums change from a light yellow-white to a brown-amber color, which makes them much less desirable for many purposes. It is the object of the present invention to provide a light-colored petrolatum which will not change to an amber brown or become significantly darkened on exposure to light, by introducing a chemical agent which does not impair the petrolatum for its normal uses, therapeutic or otherwise.

I have discovered that between substantially 0.1 and 0.001% by weight of furfuralazine when dissolved in a light-colored petrolatum will substantially retard the color deterioration of the petrolatum even when exposed to direct sunlight. Furfuralazine dissolves readily in petrolatum and in the quantities specified does not adversely affect the qualities of the petrolatum from the point of view of its use.

While greater or lesser quantities of furfuralazine may be used, the quantity should not be as great as about 1.0% because of this concentration the furfuralazine itself tends to change color on exposure to sunlight. Thus, any such quantity of furfuralazine in the petrolatum tends to increase the tendency of the petrolatum to darken rather than to retard it.

The quantity of furfuralazine used may be less than the indicated limit to any desired degree but with progressive impairment of its function. Preferably the quantity of furfuralazine used is approximately 0.01% as the use of this amount is effective to retard discoloration of the petrolatum without introducing any significant coloration from the furfuralazine itself.

Having described my invention, I claim:

1. A light-colored petrolatum containing between approximately 0.1 and 0.001% furfuralazine by weight.

2. A light-colored petrolatum containing substantially 0.01% furfuralazine by weight.

3. A light-colored petrolatum containing less than approximately 1.0% furfuralazine by weight but sufficient to prevent substantial discoloration of the petrolatum upon exposure to light.

4. The method of protecting petrolatum from discoloration caused by exposure to light, said method comprising dissolving in the petrolatum a small quantity of furfuralazine sufficient to prevent discoloration but less than 1.0% by weight.

References Cited in the file of this patent

UNITED STATES PATENTS

| | | |
|---|---|---|
| 1,594,983 | Somerville | Aug. 3, 1926 |
| 2,361,339 | White et al. | Oct. 24, 1944 |

OTHER REFERENCES

Journal of the American Chemical Society, 67, 13 (1945).